United States Patent [19]

Shiga et al.

[11] Patent Number: 4,820,775

[45] Date of Patent: Apr. 11, 1989

[54] ALPHA-OLEFIN BLOCK COPOLYMER PARTICLES AND PROCESS FOR THE PRODUCTION THEREOF

[75] Inventors: Akinobu Shiga, Ichihara; Masahiro Kakugo, Narashino; Hajime Sadatoshi, Ichihara; Hiroyuki Kora, Ichihara; Toshio Sasaki, Ichihara; Junpei Kojima, Ichihara; Kazuki Wakamatsu, Ichihara; Syozo Kawamata, Ichihara, all of Japan

[73] Assignee: Sumitomo Chemical Company Limited, Osaka, Japan

[21] Appl. No.: 866,369

[22] Filed: May 23, 1986

[30] Foreign Application Priority Data

May 23, 1985 [JP] Japan .................................. 60-110977

[51] Int. Cl.$^4$ .......................................... C08F 297/08
[52] U.S. Cl. ..................................... 525/247; 525/243; 525/249; 525/244; 525/323; 525/268; 525/270; 525/254; 525/258; 525/259; 525/262
[58] Field of Search ........................ 525/247, 268, 270

[56] References Cited

U.S. PATENT DOCUMENTS

| | | | |
|---|---|---|---|
| 4,210,738 | 7/1980 | Hermans et al. | 526/152 |
| 4,259,461 | 3/1981 | Shiga et al. | 525/247 |
| 4,298,713 | 11/1981 | Morita et al. | 525/268 |
| 4,339,557 | 7/1982 | Hasuo et al. | 525/247 |
| 4,412,049 | 10/1983 | Shiga et al. | 526/127 |
| 4,455,405 | 6/1984 | Jaggard et al. | 525/247 |
| 4,483,966 | 11/1984 | Suzuki et al. | 525/323 |
| 4,485,035 | 11/1984 | Shiga et al. | 502/115 |
| 4,533,706 | 8/1985 | Shiga et al. | 526/119 |
| 4,550,144 | 10/1985 | Chiba et al. | 525/247 |
| 4,554,264 | 11/1985 | Shiga et al. | 502/112 |
| 4,711,940 | 12/1987 | Yamamoto et al. | 525/247 |

Primary Examiner—Wilbert J. Briggs, Sr.
Attorney, Agent, or Firm—Birch, Stewart, Kolasch & Birch

[57] ABSTRACT

A process for the production of α-olefin block copolymer particles having excellent impact resistance at low temperature and excellent molding and processing characteristics, is disclosed. The process includes a two step gas phase polymerization procedure under specific conditions in the presence of a specific catalyst system.

8 Claims, 3 Drawing Sheets

ALPHA-OLEFIN BLOCK COPOLYMER PARTICLES AND PROCESS FOR THE PRODUCTION THEREOF

The present invention relates to α-olefin block copolymer particles which are produced by so-called gas phase polymerization where gaseous α-olefins are directly converted into polymer. More particularly, the present invention relates to α-olefin block copolymer particles having excellent impact resistance at low temperature and excellent molding and processing characteristics, and a process for the production thereof by polymerizing α-olefins by two steps under specific conditions in the presence of a specific catalyst system.

BACKGROUND OF THE INVENTION

Since a catalyst for producing stereoregular polymers had been discovered by Ziegler, Natta et al., crystalline α-olefin polymers have been produced on an industrial scale. Among the conventional processess for the industrial production of the polymers, a slurry polymerization process has the most widely been used, wherein an α-olefin(s) is(are) polymerized in an inert liquid solvent.

However, the slurry polymerization process has some drawbacks. For instance, the produced polymer is separated from the solvent and then dried. The separated solvent contains low-crystalline polymers dissolved therein, and hence, in order to re-use the solvent, the dissolved polymers must be removed therefrom. That is, after the removal of the low-crystalline polymers, the solvent is purified and then re-used. Thus, this process requires a complicated procedure and a large amount of energy for the removal of low-crystalline polymers. Moreover, when a polymer containing a large amount of low-crystalline polymers is produced by the process, the low-crystalline polymers are dissolved in the solvent in a large amount, which causes an increase in the viscosity of the polymerization system. In such a case, it is difficult to remove the heat of polymerization, and further, due to adhesion of the polymer particles onto the polymerization vessel, the desired polymer is hard to obtain. To avoid such drawbacks in the slurry polymerization, it has been proposed to polymerize α-olefin(s) in the gaseous phase in the absence of an inert liquid solvent, but such a gas phase polymerization process still has some problems to be solved to produce a block copolymer having improved impact resistance at low temperatures and improved molding and procesasing characteristics.

One of the most important problems in the gas phase polymerization process is that the production of a polymer containing a large amount of low-crystalline polymers, such as a block copolymer having excellent impact resistance, the polymer particles usually adhere easily onto the polymerization vessel and hence it is difficult to obtain the desired polymer in a stable manner. To eliminate this effect, it is necessary to lower the adhesion properties of the polymer particles.

As a reaction vessel for the gas phase polymerization of α-olefin(s), there are used an agitating mixing type vessel, a fluidized bed type vessel, an agitating fluidized bed type vessel, and the like. However, with an increase of adhesion of the polymer particles, an extremely large force for agitation is required to obtain the desired rotation of the agitator, which causes difficulty in the design of the apparatus. In addition, an occasionally difficulty in the homogeneous mixing of the reaction mixture arises and some portions reach too high of a temperature, which results in the production of a partial chunk injuring the agitator, thermometer, etc. within the reaction vessel or resulting in difficulty in removing the polymer through a pipe from the vessel.

Moreover, in polymerization in the fluidized bed, a slugging phenomenon tends to occur, and hence, a large amount of the polymer particles fly into the gas circulation line and adhere onto the line, which results in closing of the line. There is also occasionally produced undesirable partial chunks due to the difficulty in homogeneous mixing. In the production of polymer particles having high adhesion properties, the pipe for transferring the polymer particles is easily closed. Furthermore, undesirable bridging occurs at the lower part of a cyclone or within the hopper, and hence, the polymer cannot be removed in a stable manner.

Accordingly, it is very difficult to produce a polymer containing a large amount of low-crystalline polymer by a gas phase polymerization process, so that the process has an advantage in that there is not liquid solvent dissolving the low-crystalline polymer.

Another important problem in the gas phase polymerization process is that it is necessary to prevent a wide range of particle size distribution. That is, according to the conventional gas phase polymerization process, to homogeneously mix the reaction mixture and to remove easily the heat of polymerization, a part of the gaseous components is usually drawn out from the top of the reaction vessel and cooled to remove partially or wholly the heat of polymerization and then returned to the reaction vessel. In a typical process where gas components are circulated, there is used a fluidized bed type vessel or an agitating fluidized bed type vessel, wherein a part or whole of the gas is circulated, and thereby, the power necessary for agitation can be saved and the mixture can homogeneously be mixed so as to result in easy removal of the heat of polymerization. However, when the polymerization is carried out by using a catalyst system containing a large amount of fine particles within a reaction vessel wherein the gas components are circulated, the fine particles of the catalyst and also the polymer particles fly within the vessel, which causes some troubles in operation. For instance, the fine particles are accompanied with the gas to be exhausted from the reaction vessel into the circulation line and adhere onto the pipes and devices provided in the line, such as the cyclone, filter, heat exchanger, compressor, flowmeter, and the like, and hence, the devices significantly lose their capacity and occasionally become inoperative due to the closing thereof. Moreover, the fine particles fly to the dilute phase of the polymer within the reaction vessel and adhere onto devices provided therein, such as thermometer. In this phase, the polymerization reaction proceeds to produce chunks which cause pipes to close. With an increase in the chunks, a homogeneous fluidized bed is hard to obtain, which results in a difficult removal of the heat of polymerization and yet a further increase in the amount of chunks. When using an agitating reaction vessel, the agitator as well as other devices, such as a thermometer, are injured by the produced chunks.

When there is used a solid catalyst which contains components having a large particle size, the catalyst particles flow insufficiently within the fluidized bed type reaction vessel, which results in incomplete removal of the heat of polymerization and hence the production of undesirable chunks increases.

There has also proposed an improved gas phase polymerization process. In this improved process, the catalyst residue and atactic polypropylene having undesirable physical properties are not substantially removed, and hence, a specific catalyst system must be used which has highly improved stereoregular properties and polymerization activity.

In addition to the problems during the polymerization process as mentioned above, the obtained polymer particles having high adhesion properties or containing a large amount of fine particles have some disadvantages in the molding and processing steps as mentioned below.

Polypropylene is usually processed into shaped products having various shapes suitable for each desired application, wherein the starting polypropylene is made molten by heating and then molded into the desired shape in a film molding machine, an injection molding machine, or the like. The starting polypropylene is usually used in the form of pellets which are prepared by admixing the polymer particles with conventional additives such as neutralizing agents, heat stabilizers, antioxidants, UV-absorbers, light stabilizers, etc. and melting by heating in an extruder and then molding into pellets. This step of molding into pellets requires a large amount of apparatus and also a large power and energy for heating and extruding.

To eliminate these problems, it has also proposed to directly mold the polypropylene particles admixed with additives without preforming into pellets. However, the direct molding of the polymer particles still has some problems and has rarely been employed practically. One of the main problems is that the particles are not suitable for adaptation to the molding machine, that is, the particles are insufficiently separated at the cyclone of the hopper loader provided in the molding machine and fly into atmosphere. Additionally, when polymer particles having high adhesion properties are molded, the particles adhere onto and close various devices provided in the molding machine, such as pipes for transferring, hoppers, cyclones, etc., by bridging. Thus, it has been desired to improve the properties of the polymer particles for the purpose of molding and processing thereof.

SUMMARY OF THE INVENTION

The present inventors have extensively studied an improvement in the production of α-olefin block copolymers having excellent properties and have found that the desired polymer can be produced by polymerizing α-olefins in two steps under specific conditions in the presence of a specific catalyst system.

Accordingly, object of the invention is to provide an improved gas phase polymerization process wherein gaseous α-olefins are directly converted into a polymer.

Another object of the present invention is to provide a process for the production of α-olefin block copolymer particles having excellent impact resistance at low temperatures and excellent molding and processing characteristics.

A further object of the present invention is to provide a process for the production of the desired copolymer particles as described above in a stable manner on industrial scale.

These and other objects and advantages of the invention will be apparent to those skilled in the art from the following description.

BRIEF DESCRIPTION OF THE DRAWINGS

The present invention will become more fully understood from the detailed description given hereinbelow and the accompanying figures which are given by way of illustration only, and thus are not limitative of the present invention, and wherein:

In FIG. 1 and 2, the symbols have the following meanings:

1: a body of a fluidized bed type reaction vessel, 2: a reaction of reduced flow speed, 3: an agitator, 4: a jacket, 5: a nozzle for feeding a solid catalyst, 6: a nozzle for feeding an aluminum compound and an electron donor, 7: a cyclone, 8: a nozzle for taking out flying particles into the cyclone, 9: a filter, 10: a compressor, 11: a heat exchanger, 12: a nozzle for feeding monomers and hydrogen, 13: a nozzle for removing polymer particles, 14: a valve, 15: a valve, 16: a line for transferring polymer particles, 17: a nozzle for taking out polymer particles.

Figure 3:
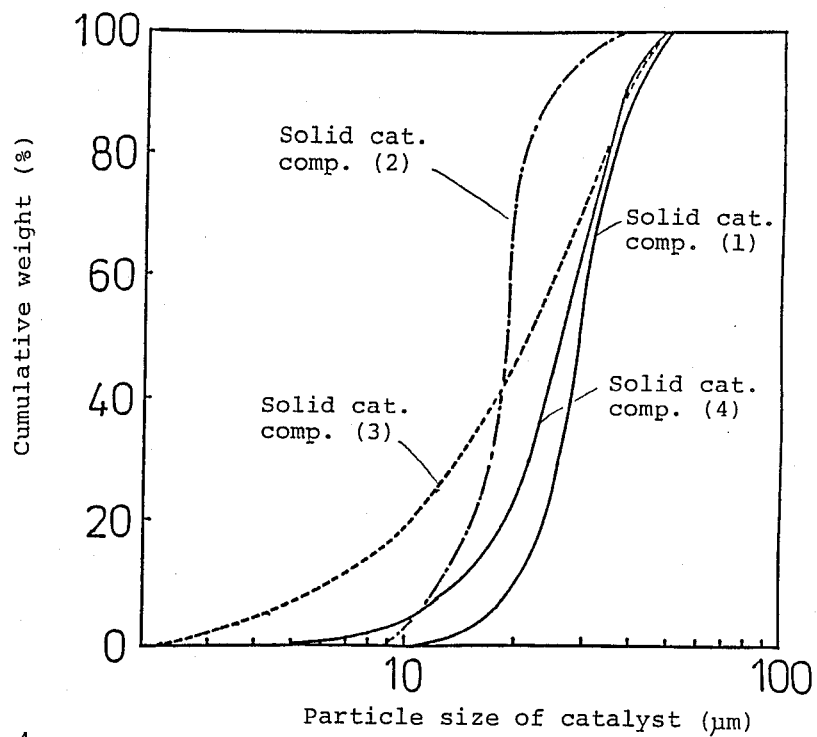
Figure 4:
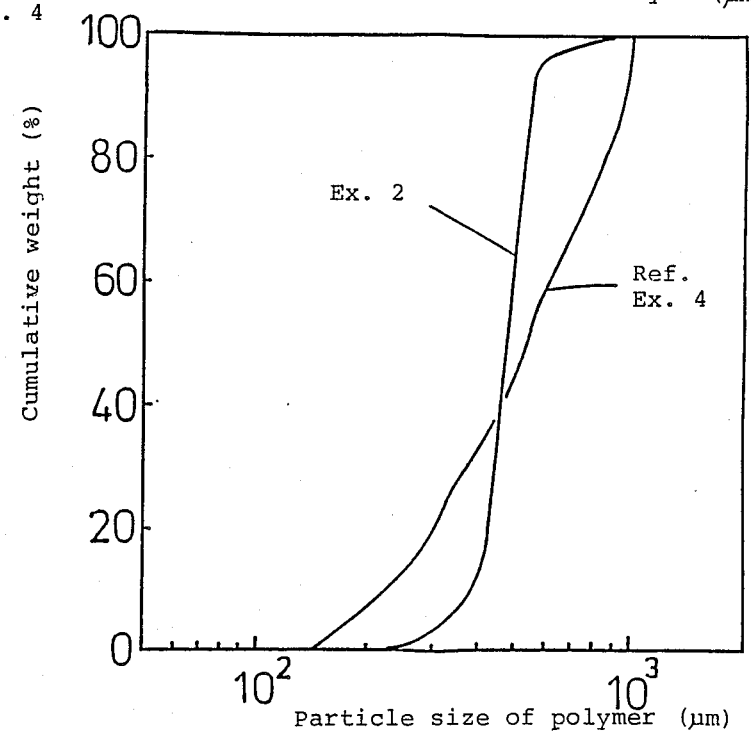
Figure 5:
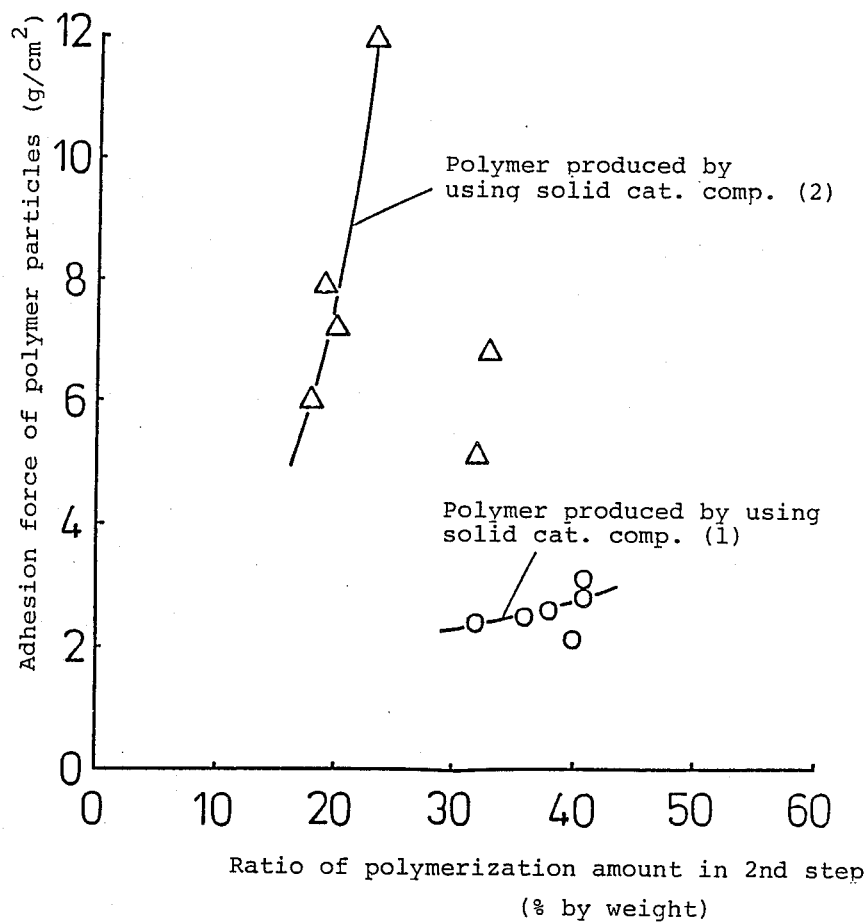

FIG. 3 shows graphically the distribution of particles of the solid catalyst components used in the Examples and Reference Examples;

FIG. 4 graphically shows the distribution of the polymer particles produced in the Examples and Reference Examples, and FIG. 5 graphically shows a correlation between the ratio of the amount of polymerization in the second step and the adhesion force of the produced polymer particles the Examples and Reference Examples.

DETAILED DESCRIPTION OF THE INVENTION

The process for the production of α-olefin block copolymer particles of the invention comprises (1) a first step comprising homopolymerizing propylene or copolymerizing propylene with a comonomer of ethylene or an α-olefin having 4 to 6 carbon atoms so that the content of the comonomer to be copolymerized in the copolymer produced in this step becomes in the range of not more than 6% by mole, and further that the polymer produced in this step shares 90 to 30% by weight based on the whole weight of the polymer, the polymerization being carried out in liquefied propylene or in a gaseous phase, (2) a second step comprising homopolymerizing ethylene or copolymerizing ethylene, propylene and an α-olefin having 4 to 6 carbon atoms or a mixture thereof so that the ethylene content in the copolymerization product produced in this step becomes in the range of not less than 10% by mole and further that the polymer produced in this step shares 10 to 70% by weight based on the whole weight of the polymer, the polymerization in the first and second steps being carried out in the presence of a catalyst system comprising (A) a solid catalyst component containing at least titanium, chlorine and an electron-donating compound and having a pore volume of not less than 0.08 cc/g in the range of a pore radius of 200 to 15,000 Å, a mean particle size of 5 to 100 μm, and a geometric standard deviation ($\sigma g$) of the particle distribution is not more than 2, and (B) an organic aluminum compound.

The α-olefin block copolymer particles of the invention comprise (a) a first segment consisting essentially of propylene alone or a combination of propylene and not more than 6% by mole a comonomer of ethylene or an α-olefin having 4 to 6 carbon atoms; (b) a second segment consisting essentially of ethylene alone or a combination of ethylene, not more than 90% by mole of propylene and an α-olefin having 4 to 6 carbon atoms or a mixture thereof; the second segment being contained in a ratio of 10 to 70% by weight based on the whole weight of the copolymer; and have a mean particle size of 150 to 3,000 μm, a geometric standard deviation (σg) of the particle distribution of not more than 2, and an adhesion force of not more than 6.0 g/cm².

The catalyst system used in the present invention is illustrated in more detail below.

(A) Solid catalyst component:

The solid catalyst component used in this invention contains at least titanium, chlorine and an electron-donating compound and has a pore volume of not less than 0.08 cc/g in the range of a pore radius of 200 to 15,000 Å, a mean particle size of 5 to 100 μm, and a geometric standard deviation (σg) of the particle distribution of not more than 2.

According to the extensive study by the present inventors, it has been found that the adhesion force of the polymer particles has a close relationship with the pore volume in a limited range of a pore radius of the solid catalyst component.

It has already been proposed to decrease the particle size of the primary particles in the solid catalyst component and thereby to increase the specific surface area thereof (cf. U.S. Pat. No. 4,210,738). As a result of the present inventors' experiments, it has been found that when the particle size of the primary particles is reduced, the pore volume in the range of a pore radius of not more than 200 Å is usually increased, but it does not correspond to the adhesion force of the block copolymer. Moreover, according to the experiments on the relationship of the adhesion force and the pore size and pore volume, it has been found that the pore volume in the range of a pore radius of 200 to 15,000 Å has a close relationship with the adhesion force. It is assumed that when a pore volume in the range of a pore radius of 200 to 15,000 Å is larger, the primary particles associate and roughly coagulate to form secondary or higher degree coagulated particles.

The solid catalyst component used in this invention has a pore volume in the range of a pore radius of 200 to 15,000 Å (hereinafter shown by a sign: "ΔVp") and is not less than 0.08 cc/g, preferably not less than 0.1 cc/g, more preferably not less than 0.15 cc/g.

It has also been found that the particle distribution of the polymer particles has a close relationship to the particle distribution of the solid catalyst component.

Thus, the problems due to the variation of the particle size of the polymer particles will be solved by using a specific catalyst component having a specific particle distribution.

That is, the solid catalyst component used in the invention has a mean particle size of 5 to 100 μm, preferably 10 to 75 μm, more preferably 15 to 50 μm, and a geometric standard deviation (σg) of the particle distribution is not more than 2.0, preferably not more than 1.8. When the mean particle size is smaller than the above range, the polymer particles have a larger adhesion force and induce problems such as flying of the catalyst and polymer particles within the fluidized bed type reaction vessel. On the other hand, when the mean particle size is larger than the above range, the minimum flow rate in the fluidized bed type reaction vessel increases significantly and thereby it becomes very difficult to obtain a stable flowing state, which causes an undesirable production of bulky polymer particles.

Assuming that a logarithmic probability distribution equation is applicable to the particle distribution, the geometric standard deviation (σg) of the particle distribution can be calculated by a comparison of both factors in the following formula, wherein $\overline{Dg}$ means a particle size in the case of accumulating weight % of the polymer particles being 50% by weight, and $\overline{Dp}$ means a particle size in the case of accumulating weight % of the polymer particles being 15.8% by weight:

$$\sigma g = \frac{\overline{Dg}}{\overline{Dp}}$$

When the σg is larger than the above range, there is a problem of production of too fine polymer particles or of polymer particles having a larger particle size.

By using the solid catalyst component having a specific mean particle size and a specific particle distribution of the present invention, there can advantageously be obtained the desired polymer particles having excellent molding and processing characteristics with less fine particles.

The process of this invention can produce α-olefin block copolymer particles having a mean particle size of 150 to 3,000 μm, preferably 300 to 2,300 μm, more preferably 450 to 1,500 μm, and a geometric standard deviation (σg) of the particle distribution of not more than 2.0, preferably not more than 1.8. When the particle size of the polymer particles is less than the above range or when the polymer particles contain a large amount of fine particles, they have problems as mentioned hereinbefore.

It has also been found by the present inventors' experiments that the adhesison force of the polymer particles should be not more than 6.0 g/cm², preferably not more than 5.0 g/cm², more preferably not more than 4.0 g/cm², and thereby, various problems due to the adhesion of polymer particles as mentioned hereinbefore are solved. The solid catalyst components used in this invention can produce the desired polymer particles having excellent impact resistance and a small adhesion force.

Each component of the solid catalyst component is specifically illustrated below.

Titanium compound is used as a main component as it exists or in the form of residing on an appropriate carrier. The titanium compound used in this invention includes chlorinated titanium compounds of the formula: $Ti(OR^1)_b Cl_{a-b}$ wherein $R^1$ is a hydrocarbon group having 1 to 20 carbon atoms, a is an integer of 3 or 4, and b is a number in the formula $0 \leq b \leq a$. The hydrocarbon group for $R^1$ includes, for example, a straight chain or branched chain alkyl group having 1 to 20 carbon atoms, such as methyl, ethyl, n-propyl, isopropyl, n-butyl, isobutyl, n-amyl, isoamyl, n-hexyl, n-heptyl, n-octyl, n-decyl, n-dodecyl, etc.; an aryl group having 6 to 20 carbon atoms, such as phenyl, cresyl, xylyl, naphthyl, etc.; a cycloalkyl group having 5 to 7 carbon atoms, such as cyclohexyl, cycloheptyl, etc.; an alkenyl group having 2 to 20 carbon atoms, such as propenyl, etc.; and an aralkyl group having 7 to 20 carbon atoms, such as benzyl, phenethyl, etc., preferably a straight chain alkyl group having 2 to 18 carbon atoms and an aryl group having 6 to 18 carbon atoms. Suitable examples of the titanium compounds ar titanium trichloride, mono-$R^1$-substituted dichlorotitaniums (e.g. monoalkoxydichlorotitaniums), di-$R^1$-substituted monochlorotitaniums (e.g. dialkoxy-monochlorotitaniums), titanium tetrachloride, mono-$R^1$-substituted trichlorotitaniums (e.g. monoalkoxytrichlorotitaniums), di-$R^1$-substituted dichlorotitanium (e.g. dialkoxy-dichlorotitanium), and the like. The chlorinated titanium compounds may have two or more different $OR^1$ groups. Among the chlorinated titanium compounds, $TiCl_3$ is one of the most suitable transition-metal compounds. It is known that this titanium chloride is in the crystalline forms of $\alpha$-, $\beta$-, $\gamma$-, and $\delta$-type. To produce a polymer having streoregularity from an $\alpha$-olefin having 3 or more carbon atoms, it is preferable to use $\alpha$-, $\gamma$- or $\delta$-type $TiCl_3$ having a layer structure. The $TiCl_3$ contains usually 1 to 15 wt. % of an ether compound. The titanum compounds used in this invention also include the trivalent titanium halide compounds containing an alkoxy group of the formula: $Ti(OR^1)_bCl_{3-b}$ wherein $R^1$ is a hydrocarbon group having 1 to 20 carbon atoms as defined above, and b is a number in the formula $0.001 < b < 0.15$, which are disclosed in Japanese Patent First Publication No. 228504/1985 (=U.S. Ser. No. 725,499). The compounds also usually contain 1 to 15 wt. % of an ether compound.

When the titanium compound is carried on a carrier, there can be used various carriers, such as various solid polymers, particularly a polymer of an $\alpha$-olefin; various solid inorganic compounds, particularly oxides (e.g. $SiO_2$, $Al_2O_3$, etc.), hydroxides (e.g. $Mg(OH)Cl$, etc.), and halides (e.g. $MgCl_2$, etc.). Preferred carriers are magnesium compounds, i.e. magnesium halides, magnesium oxide, magnesium hydroxide, magnesium hydroxyhalides. A particularly preferred magnesium compound is a magnesium halide (e.g. magnesium chloride, etc.). A preferred transition-metal compound is a halide of titanium (e.g. titanium tri- or tetra-chloride, phenoxytitanium trichloride, etc.). The catalyst component containing titanium, magnesium and chlorine components which are carried on a carrier as mentioned above is particularly preferred in this invention.

The electron-donating compounds contained in the catalyst component (A) are preferably ether compounds and ester compounds.

Suitable examples of the ether compounds are dialkyl ethers having 1 to 10 carbon atoms in each alkyl moiety, such as diethyl ether, di-n-propyl ether, diisopropyl ether, di-n-butyl ether, di-n-amyl ether, diisoamyl ether, dineopentyl ether, di-n-hexyl ether, di-n-octyl ether, methyl n-butyl ether, methyl isoamyl ether, ethyl isobutyl ether, etc. Among these, di-n-butyl ether and diisoamyl ether are particularly preferable.

Suitable examples of the ester compounds are lower alkyl ($C_{1-10}$) or phenyl esters of mono- or polyvalent carboxylic acids, such as aliphatic carboxylic acids having 1 to 20 carbon atoms, olefin carboxylic acids having 1 to 20 carbon atoms, alicyclic carboxylic acids having 3 to 20 carbon atoms, and aromatic carboxylic acids having 6 to 20 carbon atoms, and include specifically methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluylate, ethyl toluylate, ethyl anisate, diethyl succinate, dibutyl succinate, diethyl malonate, dibutyl malonate, dimethyl maleinate, dibutyl maleinate, diethyl itaconate, dibutyl itaconate, monoethyl phthalate, dimetyl phthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate, diphenyl phthalate, and the like.

The electron-donating compound is preferably contained in the solid catalyst component in an amount of 1 to 20% by weight, more preferably 3 to 15% by weight, based on total weight of the catalyst component (A).

The catalyst to be used in the present invention should have a high streorgularity and a high polymerization activity to provide well balanced properties to the produced block copolymer and also to obtain the desired product without subjecting the polymer particles produced by the polymerization reaction to an ash removal treatment.

The present inventors' have found that when the polymer is produced at a production yield of 6,000 g or more, preferably 8,000 g or more, per 1 g of the solid catalyst component (A), the resulting polymer can be subjected to molding and processing without the necessary removal of the catalyst residue. When the production yield of the polymer is less than the above, the product after molding and processing becomes undesirably yellow in color or shows inferior weatherability.

It has also been found that the above desirable feature can particularly be achieved by polymerizing the monomers in liquefied propylene in the presence of hydrogen by using the solid catalyst component (A) together with an organic aluminum compound (B) and optionally an electron donor (C) at such a production yield that polypropylene is produced in an amount of 6,000 g or more per 1 g of the solid catalyst component (A) by reacting for 4 hours and further under the conditions that the polymer has a content of a component soluble in xylene at 20° C. of not more than 5% by weight, preferably not more than 4% by weight.

The method for preparing the desirable solid catalyst component (A) is disclosed, for example, in Japanese Patent Application No. 85597/1984 (=Japanese Patent First Publication No. 228504/1985), Japanese Patent First Publication No. 30407/1981, and Japanese Patent Application No. 138471/1983 (=Japanese Patent First Publication No. 28405/1985).

(1) In Japanese Patent Application No. 85597/1984 (Japanese Patent First Publication No. 228504/1985), there is disclosed the following method.

A titanium compound of the formula: $Ti(OR^1)_nCl_{4-n}$ wherein $R^1$ is a hydrocabon group having 1 to 20 carbon atoms, and n is a number in the formula $0 < n \leq 4$, is reduced by an organic aluminum compound of the formula: $AlR^2_mY_{3-m}$ wherein $R^2$ is a hydrocarbon group having 1 to 20 carbon atoms, Y is a halogen atom, and m is a number in the formula $1 \leq m \leq 3$ to give a solid product having a hydrocarbyloxy group which is insoluble in hydrocarbon solvents. The solid product thus prepared is subjected to pre-polymerization with ethylene and then heated in the state of a slurry in the presence of an ether compound and titanium tetrachloride in a hydrocarbon solvent at a temperature of 30° to 100° C., and thereby, there is produced a solid catalyst component containing a hydrocarbyloxy group.

In the above method, the preferred titanium compound is a compound of the formula: $Ti(OR^1)_nCl_{4-n}$ wherein $R^1$ is as defined above and n is a number in the formula $2 \leq n \leq 4$.

(2) In Japanese Patent First Publication No. 30407/1981, there is disclosed the following method for preparing a solid catalyst component.

An organic magnesium compound is reacted with at least one of the following halogen-containing compounds (I) and (II):

(I) a halogenated silicon compound of the formula: $R_nSiCl_{4-n}$ wherein R is a hydrocarbon group having 1 to 8 carbon atoms, and n is a number in the formula $0 \leq n \leq 4$, (II) a halogenated aluminum compound of the formula: $R_lAlCl_{3-l}$ wherein R is a hydrocarbon group having 1 to 8 carbon atoms, and l is a number in the formula $0 \leq l < 3$, a group of compounds (III) which comprises at least two compounds selected from compounds containing at least one of an N atom, O atom, P atom and S atom (wherein the at least two compounds are compounds having different bonding, and a titanium compound having at least one titanium-chlorine bond.

In the above method, it is preferable to use a chlorinated silicon compound as the chlorine-containing compound and to use a phenol and an ester compound as the group of compounds (III).

(3) In Japanese Patent Application No. 138471/1983 (Japanese Patent First Publication No. 28405/1985), there is disclosed the following method for preparing a solid catalyst component.

Titanium tetrachloride is reduced by an organic aluminum compound of the formula: $R^1{}_nAlY_{3-n}$ wherein $R^1$ is a hydrocarbon group having 1 to 18 carbon atoms, Y is a halogen atom, and n is a number in the formula $1 < n < 3$, and then subjected to a heat treatment at a temperature of 150° C. or lower to give a solid product containing $\gamma$-type titanium trichloride. The solid product thus prepared is subjected to pre-polymerization with an $\alpha$-olefin and then reacted with a halogen of the formula: $X_2$ wherein X is Cl, Br or I, and/or a halogen-halogen compound of the formula: $X'-X''_a$ wherein $X'$ and $X''$ are each Cl, Br or I and a is 1 or 3, and also with an ether compound of the formula: $R^2-O-R^3$ wherein $R^2$ and $R^3$ are the same or different and are each an alkyl group having 1 to 10 carbon atoms at a temperature of 50° to 100° C.

In the above method, the reduction of titanium tetrachloride with the organic aluminum compound is preferably carried out within a short period of time.

(B) Organic aluminum compound

The organic aluminum compound of the formula $R_eAlX_{3-e}$ wherein R is a hydrocarbon group having 1 to 18 carbon atoms, X is a halogen atom, and e is a number in the formula $1 \leq e \leq 3$, includes, for example, triethylaluminum, triisobutylaluminum, diethylaluminum hydride, diethylaluminum chloride, diethylaluminum bromide, ethylaluminum sesquichloride, ethylaluminum dichloride, and the like. Among these compounds, triethylaluminum, diethylaluminum chloride and a mixture thereof are particularly preferable in view of the well balanced polymerization activity and stereoregularity.

(C) Electron donor

The catalyst system used in the present invention comprises the solid catalyst component comprising a titanium compound and the organic aluminum compound. To further improve the polymerization activity and/or stereoregularity, it is advisable to use an electron donor (C).

The electron donor includes, for example, esters, such as ethyl acetate, $\epsilon$-caprolactone, methyl methacrylate, ethyl benzoate, ethyl p-anisilate, and methyl-p-toluylate; acid anhydrides, such as anhydrous phthalic acid; ether compounds, such as di-n-butyl ether, diphenyl ether, diglyme; organic phosphorus compounds, such as tri-n-butyl phosphate, triphenyl phosphite, hexamethylene phosphoric triamide; organic silicon compounds having an Si—O—C bond, such as alkoxysilanes, aryloxysilanes; and the like. Other compounds such as ketones, amines, amides and thioethers may also be used. Preferred electron donors are esters, phosphites and organic silicon compounds. In the case of a solid catalyst component comprising titanium, magnesium and halogen which are carried on a carrier, aromatic monocarboxylic acid esters and organic silicon compounds are particularly preferable electron donor.

In the catalyst system, the ratio of each of the components are as follows. The organic aluminum compound (B) is preferably contained in an amount of 0.1 to 1,500 mole per 1 mole of titanium in the solid catalyst component (A). When the solid catalyst component is mainly composed of trivalent titanium compound, the organic aluminum compound is preferably contained in an amount of 1 to 30 mole per 1 mole of titanium in the solid catalyst component. In the case of a solid catalyst component which is carried on a carrier such as a magnesium compound and silica gel, the organic aluminum compound is preferably contained in an amount of 40 to 1,500 mole per 1 mole of titanium in the solid catalyst component.

The electron donor is preferably contained in an amount of not more than 1 mole per 1 mole of the organic aluminum compound.

The organic aluminum compound and/or electron donor may also be added in the second step of the polymerization reaction.

The polymerization reaction is described in more detail below.

Production of propylene-ethylene block copolymer;

According to this invention, the propyleneethylene block copolymer is produced by a two step polymerization reaction using the above-mentioned catalyst system. In this case, to produce the desired polymer particles having a smaller adhesion force and excellent physical properties, it is necessary to use a catalyst system having high stereoregularity. When the polymerization reaction is carried out by using a catalyst system having low stereoregularity, the produced polymer particles have a significantly increased adhesion force and also show less toughness and less heat resistance. It has been found that it is preferable to polymerize so that when the monomers are reacted in liquefied propylene at 65° C. for 4 hours, the polymer contains a component soluble in xylene at 20° C. in an amount of not more than 5% by weight, more preferably not more than 4% by weight, to obtain the desired polymer having excellent physical properties and the preferred state of the polymer particles.

When the monomers are polymerized in the first step by using a high capacity catalyst system, the amount of non-crystalline polymer varies depending on the amount of comonomer. It is preferable to control the production of a component soluble in xylene at 20° C. to the range of not more than 15% by weight, more preferably not more than 5% by weight.

The solid catalyst component may previously be subjected to polymerization of at least one $\alpha$-olefin having 2 to 6 carbon atoms, preferably either ethylene or propylene, in an amount of not more than 1,000 g, preferably not more than 100 g, per 1 g of the solid catalyst component in the presence of an organic aluminum compound and/or an electron donor. The resulting composition is used as a solid catalyst component.

The first step of the polymerization reaction of this invention can be carried out in liquefied propylene and/or in a gaseous phase in the presence of a catalyst system. That is, the polymerization can be carried out by reacting the monomers in liquefied propylene, or by reacting monomers first in liquefied propylene and then in a gaseous phase, or by reacting the monomers in a gaseous phase, but the polymerization in a gaseous phase is preferable because the flash distillation of liquefied propylene can be omitted. Hence, undesirable adhesion of soluble polymer onto the wall of the reaction vessel during the flashing of liquefied propylene can be avoided.

The feature of the first step of polymerization is specifically mentioned below.

The polymerization may occur by homopolymerization of propylene, or by copolymerization of propylene and a comonomer such as ethylene or an α-olefin having 4 to 6 carbon atoms. It is preferable to regulate the amount of the comonomer so that the polymer produced in this first step has a comonomer content of not more than 6% by mole, more preferably not more than 4% by mole. When the comonomer content is over 6% by mole (or in a more preferable feature, over 4% by mole), the block copolymer shows an inferior flexural modulus and inferior heat resistance. The polymerization in liquefied propylene is preferably carried out at a temperature of 40° to 90° C. under a pressure of 17 to 50 kg/cm². The polymerization in a gaseous phase is preferably carried out at a temperature lower than the melting point of the polymer, more preferably at 40° to 100° C., under a pressure of from atmospheric pressure to 40 kg/cm² under the conditions that the monomers are not liquified within the reaction vessel. In this first step, it is further preferable to add a molecular weight regulating agent (e.g. hydrogen, etc.) to the reaction system in order to improve the melt flow properties of the final product.

The polymerization in the second step is carried out consequently after the polymerization in the first step. The polymerization is carried out by homopolymerizing ethylene in a gaseous phase, or by copolymerizing ethylene with propylene and/or an α-olefin having 4 to 6 carbon atoms so that the produced polymer has an ethylene content of not less than 10% by mole. This second step may also be carried out in a liquefied monomer comprising mainly propylene or in an inert hydrocarbon (e.g. hexane, heptane, etc.). However, when it is done in a liquefied monomer, too high of a polymerization pressure is required for increasing the ethylene content in the polymer produced in the step because the propylene partial pressure is high in the system, which is disadvantageous in that a high capacity apparatus is needed and further that low-crystalline polymer soluble in the liquefied monomers is increased in the range of ethylene content of 20 to 80% by mole. Therefore, the polymer is precipitated in the step of flashing of the liquefied monomers to induce fouling within the flashing vessel. It is also undesirable to conduct the polymerization in an inert hydrocarbon, because the soluble low-crystalline polymer is also increased.

The polymer produced in this second step has preferably an ethylene content of 20 to 80% by mole in view of the well balanced toughness and impact resistance of the block copolymer. The second step may be carried out in two or more stages by varying the concentration of ethylene.

The polymerization in the second step is preferably carried out at a temperature of not higher than the melting point of the polymer, preferably 40° to 100° C., under a pressure of from atmospheric pressure to 40 kg/cm² so that the monomers are not liquefied within the polymerization vessel. In order to regulate the melt flow properties of the final product, it is preferable to add a molecular weight regulating agent (e.g. hydrogen, etc.) to the reaction system in this second step.

In this second step, the polymerization is carried out in the degree of 10 to 70% by weight based on the whole polymerization amount, but it is preferable in the degree of 20 to 60% by weight, more preferably 25 to 50% by weight, because the resulting polymer has a well balanced adhesion force of polymer particles and impact resistance. When the polymerization amount in the second step is less than 10% by weight (in a preferred feature less than 20% by weight, in a more preferred feature less than 25 % by weight), the resulting polymer exhibits inferior impact resistance. On the other hand, when the polymerization amount in the second step is more than 70% by weight (in a preferred feature more than 60% by weight, and in a more preferred feature more than 50% by weight), the resulting polymer particles have a disadvantageously increased adhesion force.

The α-olefins having 4 to 6 carbon atoms used in this invention include, for instance, butene-1, pentene-1, hexene-1, 4-methylpentene-1, 3-methylbutene-1, and the like.

The present invention can provide propylene-ethylene block copolymer particles comprising substantially two segments and having a smaller adhesion force and a narrower particle distribution, wherein the first segment is formed in the first polymerization step and the second segment is formed in the second polymerization step.

The adhesion force of the polymer particles is also effected by the molecular weight of the polymer produced in the second step, and when the molecular weight of the polymer produced in the second step is larger, the adhesion force of the resulting polymer particles is lowered and improved. However, when the molecular weight of the polymer produced in the second step is made larger, the block copolymer shows, to the contrary, inferior melt flow properties and also significantly inferior molding and processing characteristics. To achieve the desired stable molding and procesing of the polymer, the melt index should be in the range of not less than 0.3 g/10 minutes, preferably not less than 0.5 g/10 minutes, and more preferably not less than 1.0 g/10 minutes. Such a melt index is obtained by regulating the intrinsic viscosity of the polymer produced in the second step to the range of not more than 7 g/dl, preferably not more than 6 g/dl, and more preferably not more than 5 g/dl.

According to this invention, even though a molecular regulating agent (e.g. hydrogen, etc.) is added in the second step to regulate the molecular weight of the produced polymer and thereby to improve the molding and processing characteristics of the product, the polymer particles demonstrate an extremely improved adhesion force. That is, there are obtained polymer particles having an adhesion force of not more than 6.0 g/cm$^2$, preferably not more than 5.0 g/cm$^2$, and more preferably not more than 4.0 g/cm$^2$.

The reaction vessel for the gas phase polymerization in this invention is not critical, but includes any known vessel, such as an agitating type reaction vessel, a fluidized bed type reaction vessel, an agitating fluidized bed type reaction vessel, and the like. However, for homogeneously mixing the reaction mixture in the whole polymerization region and easily removing the heat of polymerization, it is preferable to employ a system wherein a part or whole of the gases to be polymerized in the system is removed from the reaction vessel, cooled and recycled to the reaction vessel. Particularly, a system of polymerizing in a fluidized bed, that is, a fluidized bed type reaction vessel and an agitating fluidized bed type reaction vessel are preferable.

The polymerization reaction of the present invention may be continuously carried out by using two or more reaction vessels which are combined in series, or may be carried out in batch system by using one or more reaction vessels, or may be carried out in a combination of these systems.

This invention is illustrated by the following examples but should not be construed to be limited thereto.

The results in the Examples and the Reference Examples are shown in Tables 1 to 4 and FIG. 1 to 5. In the tables, the properties are measured by the following methods.

Melt index: by a method as set forth in ASTM D1238

Flexural rigidity: by a method as set forth in ASTM D747

Vicat softening point: by a method as set forth in ASTM D1525

Izod impact strength: by a similar method as set forth in ASTM D256, measured at 23° C., 0° C., −20° C. and −30° C.

Tensile test: by a similar method as set forn in ASTM D638, measured as to yield stress (YS), ultimate strength (US) and ultimate elongation (UE)

Intrinsic viscosity [η]: measured in Tetralin at 135° C.
  [η]$_P$: it shows the intrinsic viscosity of the polymer produced in the first step.
  [η]$_T$: it shows the intrinsic viscosity of whole polymer.
  [η]$_{EP}$: it shows the intrinsic viscosity of the polymer produced in the second step.

The [η]$_{EP}$ is calculated by the following equation:

$$[\eta]_{EP} = \frac{[\eta]_T - [\eta]_P(P)}{(EP)}$$

wherein
  (P): the ratio of the polymerization amount in the first step (ratio by weight)
  (EP): the ratio of the polymerization amount in the second step (ratio by weight)

Adhesion force of the polymer particles: Two shear testing cells made from an aluminum plate (width 30 mm, length 53 mm, height 12 mm) were piled on each other in contact, and between them polymer particles to be measured were entered and subjected to pilot pressure under a load of 1,000 g for 30 seconds and then subjected to the shear test under a normal load of 50 g, 100 g, 200 g, 300 g, and 400 g, at a room temperature and at a take-off speed of 100 mm/minute, whereby the shear stress under each normal load was measured. The correlation between the values of the normal load and the values of the measured shear stress were drawn in an approximate straight line by using a minimum square method, and the shear stress at a point on the line which was extrapolated to the normal load 0 (zero) g was counted as the adhesion force.

Component soluble in xylene at 20° C. (hereinafter referred to as "CXS"): The polymer (1 g) was dissolved in boiling xylene (200 ml) and the mixture was gradually cooled to 50° C. and further cooled to 20° C. by dipping in ice water with stirring, and the mixture was allowed to stand at 20° C. for 3 hours, and then the precipitated polymer was separated by filtration. The filtrate was distilled to remove xylene, and the residue was dried in vaccuo, and the polymer was recovered. This polymer was the component soluble in xylene at 20° C.

Ethylene content: measured by utilizing the known absorption band in an infrared absorption spectrum. The ethylene content thus measured was corresponded well to the value calculated from the balance between the amount of the starting materials and the yield.

Particle distribution: measured by using an optical transmission type device for measuring particle distribution (manufactured by Seishin Kigyo K.K., Japan) employing as a solvent decalin.

Pore volume: measured by using Porosimeter Series 800 (manufactured by Carlo Erba Co.) in the range of pore radius of 75 Å to 75,000 Å.

EXAMPLE 1

(1) Preparation of a solid catalyst component:

A 200 liter reactor was purged with nitrogen and thereto were added hexane (26 liter) and tetrabutoxytitanium (28.6 kg). The mixture was agitated at an agitation speed of 120 r.p.m. at an inner temperature of 35° C. A 40% by weight solution of ethylaluminum sesquichloride in hexane (53 kg) was added dropwise to the mixture over a period of 3 hours while keeping the temperature of the system at 35° C. After the addition, the mixture was agitated at 35° C. for 30 minutes and then heated at 60° C. for one hour. The reaction mixture was filtered and washed with hexane (100 liters) three times to obtain a solid product.

To the above reaction product was added hexane (120 liter) so as to make the solid product slurry and thereto was added triethylaluminum (1.5 kg). The mixture was heated to 50° C. while agitating at an agitation speed of 100 r.p.m. Ethylene monomer (3.5 kg) was added gradually over a period of one hour at 50° C., and subjected to a pre-polymerization. After the pre-polymerization, the reaction mixture was filtered to obtain an ethylene-pre-polymerized solid product. The ethylene-pre-polymerized solid product was made into a slurry with heptane (120 liter), and to the mixture was added diisoamyl ether (16 liter) while keeping the temperature of the system at 30° C. After reacting at 30° C. for one hour, the mixture was heated to 75° C. and thereto was added titanium tetrachloride (15 liter), and the mixture was further reacted at 75° C. for one hour. After the reaction, the reaction mixture was filtered, and the residue was washed with heptane (100 liter) three times. After the washing, the product was again treated with isoamyl ether and titanium tetrachloride in the same manner as described above.

After the reaction, the reaction product was washed with hexane (100 liter) six times and dried to give a solid catalyst component (1) (15.2 g), which contained trivalent titanium atom 22.1% by weight, isoamyl ether 6.9 % by weight, chlorine 47.7% by weight, and butoxy group 0.4 % by weight.

The particle distribution of the product is shown in FIG. 3. The solid catalyst component had a mean particle size ($\overline{Dg}$) of 30 μm, a standard deviation ($\sigma g$) of the particle distribution of 1.4., and a pore volume in the range of pore radius of 200 to 15,000 Å of 0.19 cc/g.

The solid catalyst component (1) was evaluated as to the stereoregularity and polymerization activity by subjecting it to a polymerization of propylene in a one liter reaction vessel as follows.

Th reactor was purged with argon and thereto were added the solid catalyst component (1) (17.0 mg) and diethylaluminum chloride (1.5 g), and to the mixture was added hydrogen until the hydrogen partial pressure became 0.6 kg/cm$^2$ and was further added propylene (280 g). The mixture was heated to 65° C. to initiate the polymerization reaction. After polymerization for 4 hours, the unreacted monomer was purged off to give white powdery polypropylene (120 g). The polypropylene was obtained in an amount of 7,060 g per 1 g of the solid catalyst component (1).

The component soluble in xylene at 20° C. was measured. As a result, it was 2.2% by weight, which means that it is excellent in stereoregularity and in polymerization activity.

(2) Preparation of a pre-polymerization catalyst:

A reactor having an inner value of 300 liters and an agitator was purged with nitrogen and thereto were added the solid catalyst component (1) (2.15 kg) as prepared above (1), butane (100 liter) and diethylaluminum chloride (938 g), and agitation of the mixture was started. Thereto was added propylene under a pressure of 5 kg/cm$^2$ at 40° C. After polymerization for 2.45 hours, the supplement of propylene was stopped. The reaction mixture was filtered with a filter provided at the bottom of the reactor. To the reaction mixture was added butane (100 liter), and the mixture was agitated. The reaction mixture was filtered to give a pre-polymerization catalyst. The pre-polymerization catalyst was transferred to a jacketed drum provided with a nozzle for supplying nitrogen at the bottom, and then dried by supplying a small amount of nitrogen by a flowing a hot water of 50° C. into the jacket to obtain a pre-polymerization catalyst (26.9 kg).

Figure 1:
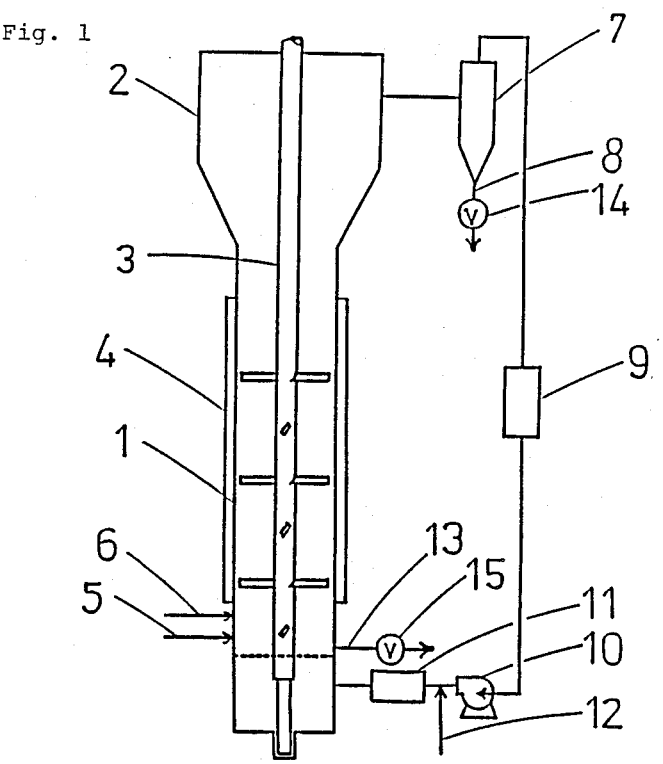
FIG. 1 shows a fluidized bed type reaction apparatus suitable for the process of the present invention.

(3) Block copolymerization of propylene-ethylene:

Block copolymerization of propylene-ethylene was carried out by a two step reaction using an agitating fluidized bed type reaction vessel (inner volume 1 m$^3$) as shown in FIG. 1, and the polymerization was repeated five times.

The reactor was first purged with dewetted nitrogen and thereto were circulated gases at a rate of 100 m$^3$/hour with a gas-circulator (10) provided on the circulation line. The gases were circulated in such an amount that the polymer particles were kept in a flowing state through whole step of the polymerization, and the circulation amount of the gases was kept at constant until the polymer particles were removed from the reactor after completion of the polymerization. To the reactor were added polypropylene particles (propylene homopolymer of [η]: 1.7 dl/g, mean particle size: 600 μm) (60 kg) to disperse the catalyst, and the content within the reactor was replaced by propylene. Thereafter, propylene and hydrogen were added to raise the inner pressure till 5 kg/cm$^2$ (gauge pressure "G") and to reach a hydrogen concentration of 6.3% by mole. A promotor component mentioned below was supplied from a nozzle (6) under pressure with hydrogen. Diethylaluminum chloride (160 g) and then the pre-polymerization catalyst obtained in (2) (66.3 g) were supplied from a nozzle (5).

In the first step of the polymerization, the temperature within the reactor was raised to 65° C. and the reactor was kept under a pressure of 5 kg/cm$^2$G for one hour, and the pressure was raised to 19.7 kg/cm$^2$G and the polymerization was continued. During the first step, hydrogen was continuously supplied to keep the hydrogen concentration of 6.3% by mole. When the amount of polymerization became 32 kg, the unreacted monomer was purged until the inner pressure lowered to 11 kg/cm$^2$G.

In the second step of the polymerization, while keeping the inner temperature at 65° C., ethylene and propylene were supplied so that the ethylene concentration became 16% by mole and the pressure became 15 kg/cm$^2$G. After the pressurization, ethylene, proplene and hydrogen were supplied so that the concentrations of ethylene and hydrogen were kept at 16% by mole and 6% by mole, respectively and also the pressure was kept at 15 kg/cm$^2$G. When the amount of polymerization became 18 kg, the content was purged until the inner pressure lowered to 5 kg/cm$^2$G. The polymer particles thus produced were removed from the reactor so that the polymer particles were retained in an amount of 60 kg. Then, the first series of polymerization was completed.

The second series of polymerization was conducted by replacing ethylene by propylene until the ethylene concentration became not more than 0.1% by mole, supplying propylene and hydrogen so that the pressure became 5 kg/cm$^2$G and the hydrogen concentrtion became 6.3% by mole, and then supplying the same catalyst component as used in the first polymeriation except that diethylaluminum chloride was used in an amount of 73 g. The second series of polymerization was carried out under the same conditions as in the first series of polymerization except that the retained polymer particles obtained in the first polymerization were used for the dispersion of catalyst.

The polymerization as above was repeated five times, and the whole of the resulting polymer particles were removed from the reactor. The polymer particles thus removed were transferred to a 200 liter agitating vessel, and thereto were added propylene oxide (100 g) and methyl alcohol (60 g), and the mixture was heated at 80° C. for 2 hours. The reaction mixture was dried at 80° C. while ventilating nitrogen to give white powdery polymer.

By the above polymerization, there was obtained the polymer in an amount 9,400 g per 1 g of the solid catalyst component (1). The results of the polymerization are shown in Table 1 and FIG. 5. Even though the polymerization in the second step was carried out in a polymerization amount of 36% by weight based on the whole polymerization amount, the polymer particles showed an adhesion force of 2.5 g/cm$^2$, which is excellent.

The removal of the polymer particles from a nozzle (13) provided in the reactor could be carried out without any problem. When the amount of the polymer particles collected at a cyclone (7) was measured to evaluate the fly of polymer particles from the reactor, it was 450 g, which did not present any problems for operation.

After the polymerization procedure, the reactor was checked. As a result, the adhesion of the polymer onto the inner wall and agitator was so small that the metallic surface was highly visible, which did not cause any problems.

The polymer particles obtained above were mixed with calcium stearate (0.1% by weight), 2,6-di-tert.-butyl-p-cresol (0.2% by weight), and tetrakis[methylene-3-(3,5-di-tert.-butyl-4-hydroxyphenol)propionate]methane (0.1% by weight), and the mixture was extruded in the form of strands by an extruder provided with a screw (diameter 40 mm $\phi$) and then pelletized. In this case, the polymer particles could be extruded from the hopper of the extruder without any problem of bridging and surging, etc. The properties of the pellets thus prepared were measured. The results are shown in Table 2. As is clear from Table 2, the product had very excellent impact strength even at a low temperature. The formed product did not show any problem such as coloring.

The component soluble in xylene at 20° C. of the polymer obtained in the first step of this example was measured by the same polymerization in the first step using the same catalyst component as used in the example. As a result, it was 2.9% by weight.

EXAMPLES 2 TO 4 AND REFERENCE EXAMPLES 1 TO 5

The block copolymerization of propylene-ethylene was carried out by a two step reaction using a 5 liter autoclave provided with an agitator. The autoclave was dried for one hour under a reduced pressure with a vacuum pump and thereto were added diethylaluminum chloride diluted with a small amount of heptane (hereinafter, referred to as "DEAC") and a solid catalyst containing titanium trichloride. The pressure of this vessel was raised with hydrogen ($H_2$) and thereto was supplied liquefied propylene, and the first step polymerization was initiated after regulating the temperature at 60° C. After polymerization for one hour, unreacted monomer was purged off, and then a small amount of polymer was removed as a sample for measuring $[\eta]_p$ and CXS. Thereto was supplied $H_2$, and the pressure was raised to 6.9 kg/cm$^2$G by adding propylene and further to 10 kg/cm$^2$G by adding ethylene. After regulating the temperature to 60° C., the second step of polymerization was initiated. During the second step, the pressure was maintained at 10 kg/cm$^2$G by supplying a mixture of ethylene and propylene (molar ratio: 50/50). When the polymerization amount of in the second step reached the desired degree, unreacted monomer was purged off. The amounts of polymerization in the first step and the second step and the ratio thereof were calculated based on the amounts of the starting materials and the products.

The polymerization conditions and results are shown in Table 3 and Table 4 and FIG. 3, 4 and 5, respectively.

In Examples 2 to 4, the block copolymerization of propylene and ethylene was conducted by varying the amount of polymerization in the second step using the solid catalyst component (1). With an increase of in the amount of polymerization in the second step, the polymer particles showed a somewhat increased adhesion force, but the adhesion force was still at a good level. As shown in Example 4, even when the ratio of the amount of polymerization in the second step was 41% by weight, the adhesion force of the polymer particles presented still in 3.1, which was no problems.

In Reference Examples 1 to 3, the block copolymerization of propylene and ethylene was carried out by using a solid catalyst component which had a narrower $\Delta V_P$ than that used in the present Examples. In the Reference Examples, the adhesion force of the polymer particles relative to the amount of polymerization in a second step was significantly higher than that in the present Examples. In Reference Example 2, the polymer particles showed an adhesion force as high as 7.9 g/cm$^2$, and when checked after the polymerization, the reactor was lamellarly adhered with a significantly large amount of polymer particles on the inner wall and the adhered polymer particles were almost solidified.

In Reference Example 4, the block copolymerization of propylene and ethylene was carried out by using a solid catalyst which had the same range of $\Delta V_P$ as in the present Examples but had a wider range of particle distribution and contained a large amount of fine particles. The adhesion force of the polymer particles relative to the polymerization amount in the second step was higher than that in the present Examples. After the polymerization, the reactor was checked, and as a result, fine particles were adhered onto the inner wall and the agitator in a thin layer. There were observed many chunks having a diameter of 5 to 10 mm. To measure the relationship of the particle size of the polymer particles and the adhesion force of the particles, the adhesion force of the particles was measured in the following screened classes in particle size. The results are shown in the following table.

| Particle size ($\mu$m) | Adhesion force (g/cm$^2$) |
|---|---|
| Non-screened | 4.5 |
| Less than 500 | 5.6 |
| 500–1,000 | 2.2 |
| More than 1,000 | 1.7 |

As is clear from the above result, the particle size has a close relationship with the adhesion force of the polymer particles, and with a decrease in the particle size, the adhesion force increases significantly. Thus, to improve the adhesion force of the polymer particles, it is necessary to decrease the amount of fine particles.

In Reference Example 5, the polymerization was carried out by modifying the conditions so that the amount of hydrogen supplied in the second step was lowered to increase the molecular weight of the produced polymer. The polymer produced in the second step showed $[\eta]$ of 8.2 dl/g. When compared with Reference Example 4 wherein the molecular weight of the polymer was decreased while using the same catalyst system, the polymer particles showed an improved adhesion force. On the contrary, the product showed a lower melt index which is an index factor for showing the molding and processing characteristics. Thus, the product in this Reference Example 5 had significantly inferior molding and processing characteristics.

The solid catalyst components as used in the Examples and Reference Examples were prepared as follows.

(i) There was used SOLVAY CATALYST ® (manufactured by Marubeni-Solvay Co.) as the solid catalyst component (2). This solid catalyst component had a $\overline{Dg}$ of 19 $\mu$m, $\sigma g$ of 1.3 and further a pore volume in a range of a pore radius of 200 to 15,000 Å of 0.02 cc/g. When the polymerization capacity thereof was measured in the same manner as described in Example 1-(1), it produced polypropylene in an amount of 7,400 g per 1 g of the solid catalyst component. Besides, the polymer contained CXS of 3.5% by weight.

(ii) Preparation of the solid catalyst component (3):

The solid catalyst component was prepared in the same manner as described in Example 1 except that no pre-polymerization with ethylene occurred. The solid catalyst component contained trivalent titanium component 28.7% by weight, isoamyl ether 7.2% by weight, chlorine 61.6% by weight, and butoxy group 0.5% by weight.

When the the distribution of particles was measured, the solid catalyst component showed a $\overline{Dg}$ of 22 μm, σg of 2.5, and a pore volume in the range of a pore radius of 200 to 15,000 Å of 0.50 cc/g.

When the polymerization capacity thereof was measured under the same conditions as in Example 1, polypropylene was produced in an amount of 8,910 g per 1 g of the solid catalyst component and the polymer contained CXS of 2.4% by weight.

EXAMPLE 5

This example was carried out by using a solid catalyst on a carrier.

(1) Preparation of solid catalyst component (4):

(A) Preparation of an organic magnesium compound:

A 200 liter reactor was purged with nitrogen and thereto were added metal magnesium (3.5 g), di-n-butyl ether (44 liter) and a small amount of Grignard reagent. While the mixture was agitating at an agitation speed of 75 r.p.m. and keeping the inner temperature at 50° C., n-butyl chloride (15 liter) was added dropwise over a period of 5 hours. After the addition, the mixture was further reacted at 50° C. for 2 hours, and thereafter, the reaction mixture was cooled to room temperature, and the solid product was obtained by filtration.

The n-butylmagnesium chloride in di-n-butyl ether was hydrolyzed with 1N sulfuric acid and back-titrated with 1N NaOH to determine the concentration thereof (indicator: phenolphthalein). As a result, the concentration thereof was 2.26 mole/liter.

(B) Preparation of a carrier:

Subsequently, silicon tetrachloride (12.8 liter) was added dropwise to a solution of n-butylmagnesium chloride in di-n-butyl ether over a period of 6 hours, while agitating at an agitation speed of 75 r.p.m. and keeping the inner temperature at 20° C. After the addition, the mixture was further agitated at 20° C. for one hour, and the reaction mixture was filtered and washed with hexane (100 liter) four times to obtain a carrier.

(C) Treatment with phenol/ethyl benzoate:

The carrier prepared in the above (B) was made into a slurry with hexane (70 liter), and then the inner temperature was kept at 60° C.

To the mixture were added a solution of phenol (4.2 kg) in hexane (100 liter) and ethyl benzoate (6.4 liter), and the mixture was reacted at 60° C. for 30 minutes. The reaction mixture was filtered and washed with hexane (150 liter) three times at 60° C.

(D) Preparation of solid catalyst component:

To the above product was added monochlorobenzene (80 liter) to make it into a slurry, and thereto was added a solution of a compound of the formula:

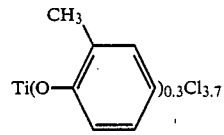

(122.4 g) in monochlorobenzene (48 liter), and the mixture was reacted at 100° C. for 30 minutes. After the reaction, the reaction mixture was filtered at 100° C. and washed at 100° C. with toluene (150 liter) one time and with hexane (100 liter) three times, and dried to give the solid catalyst component (4) (15.1 kg).

The solid catalyst component (4) contained titanium (2.5% by weight), magnesium (20.9% by weight), chlorine (65.6% by weight), phenol (1.7% by weight), and ethyl benzoate (9.1% by weight). When the distribution of the particles was measured, it showed a $\overline{Dg}$ of 27 μm, σg of 1.6, and a pore volume in the range of a pore radius of 200 to 15,000 Å of 0.17 cc/g.

In order to evaluate the stereoregularity and polymerization activity of the solid catalyst component (4), it was subjected to a polymerization of propylene in a 5 liter reactor. That is, the reactor was purged with argon and thereto were added the solid catalyst component (4) (19 mg), triethylaluminum (0.65 g) and methyl p-toluylate (0.26 g), and thereto were supplied hydrogen in a partial pressure thereof of 3 kg/cm² and further propylene (1,000 g), and the temperature was raised to 65° C. to initiate the polymerization. After reacting for 1.5 hour, the unreacted monomer was purged off to obtain white powdery polypropylene (165 g). In this polymerization, polypropylene was produced in an amount of 8,680 g per 1 g of the solid catalyst component (4). Besides, the polymer contained a component soluble in xylene at 20° C. of 3.6% by weight, which presented no problems in the stereoregularity and the polymerization activity.

(2) Block copolymerization of propylene-ethylene:

Block copolymerization of propylene-ethylene was conducted by two step reaction using a 5 liter autoclave provided with an agitator. The autoclave was dried for one hour under a reduced pressure with a vacuum pump, and thereto were supplied triethylaluminum (0.65 g) diluted with a small amount of heptane, methyl p-toluylate (0.26 g) and the solid catalyst component (4) (0.0237 g). The pressure of this vessel was raised with $H_2$ to a partial pressure of 0.79 kg/cm² and further with propylene to 4 kg/cm²G, and then thereto was supplied a mixture of ethylene and propylene (ethylene/propylene=70/30 by mole) and the temperature was kept at 60° C. During the second step polymerization, the pressure was kept at 7 kg/cm²G by supplying the gas mixture. When the polymerization occurred for 3 hours, the unreacted monomer was purged off. The polymer particles thus obtained were treated and dried in the same manner as described in Example 1 to give white powdery polymer particles. The results of the polymerization are shown in Table 2.

The relationship of the adhesion force of the polymer particles to the amount of polymerization in the second step were good and there was no problems.

EXAMPLE 6

Figure 2:
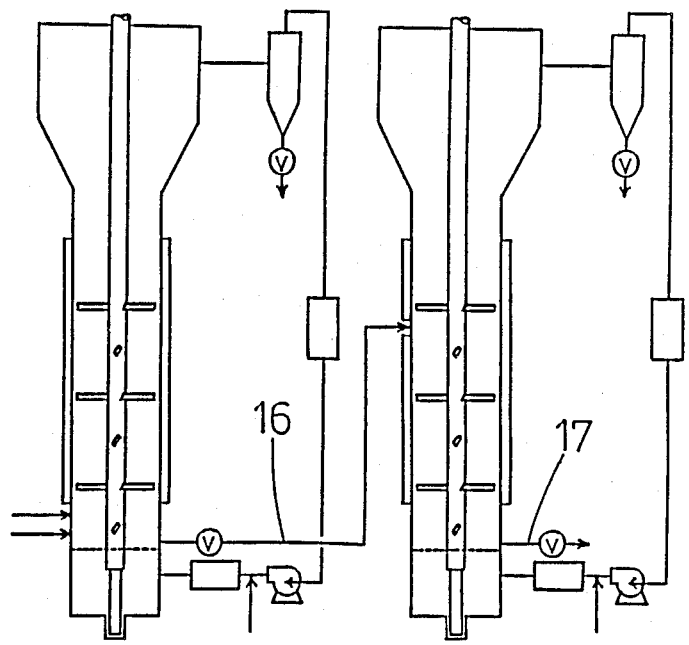
FIG. 2 shows another embodiment of a reaction apparatus suitable for the process of the present invention.

By using a fluidized bed type reaction vessel (inner volume: 1 m³) which was arranged in series as shown in the accompanying FIG. 2, the two step block copolymerization of propylene ethylene was continuously carried out. The two reactors were arranged in the same manner as in Example 1. The reactor A and reactor B were kept under the reaction conditions as shown in the following table.

| Reaction conditions | Reactor A | Reactor B |
| --- | --- | --- |
| Pressure (kg/cm$^2$G) | 20 | 16 |
| H$_2$ concentration (molar %) | 14.8 | 6.5 |
| Ethylene concentration (molar %) | 0 | 17 |
| Held up amount of polymer (kg) | 65 | 85 |
| Circulation amount of gas (m$^3$/hr.) | 120 | 100 |
| Mean temperature in polymer phase (°C.) | 65 | 65 |

A catalyst component having the following composition was continuously supplied to the polymer phase within the reactor A.

| Catalyst component | |
| --- | --- |
| The pre-polymerization catalyst as used in Example 1 [calculated by converson to the solid catalyst component (1)] | 1.2 g/hr. |
| Diethylaluminum chloride | 7.6 g/hr. |
| Triethylaluminum | 0.72 g/hr. |
| Methyl methacrylate | 1.1 g/hr. |

The polymerization reaction was continued for 170 hours after the initiation of the supplement of the catalyst. The mean polymerization amount in each reactor was calculated from the differences between the amounts of the starting materials and that of the product. As a result, the polymerization amount was 6.1 kg/hr. in the reactor A and 4.2 kg/hr. in the reactor B, respectively.

The polymerization results are shown in Table 1 and FIG. 5.

During the polymerization reaction, there was no problem in the operation of the reactor A and the reactor B, and the removal of the polymer from each reactor was carried out without any problem. Besides, after the polymerization, each reactor was checked. As a result, while there was observed some adhesion of the polymer on the wall at the position corresponding to the diluted phase of the polymer, at the position corresponding to the concentrated phase of the polymer, the metallic surface was observed. Thus, there was no problem in terms of the adhesion of the polymer.

The polymer particles thus obtained were mixed with additives as in Example 1 and pelletized with an extruder equipped with a screw (diameter 40 mm$\phi$). The polymer particles could be supplied from the hopper in the extruder without any problem of bridging. The properties of the polymer particles were measured by using the pellets thus obtained, and the results are shown in Table 2. As is clear from Table 2, the polymer particles showed an extremely excellent impact resistance even at a low temperature.

REFERENCE EXAMPLE 6

By using the same apparatus as used in Example 6, the two step block copolymerization of propylene-ethylene was continuously carried out in the same manner as described in Example 1 except that the catalyst components to be supplied and the polymerization conditions were changed as follows.

| Reaction conditions | Reactor A | Reactor B |
| --- | --- | --- |
| Pressure (kg/cm$^2$G) | 20 | 14 |
| H$_2$ concentration (molar %) | 3.7 | 3.6 |
| Ethylene concentration (molar %) | 0 | 17 |
| Held up amount of polymer (kg) | 70 | 60 |
| Circulation amount of gas (m$^3$/hr.) | 120 | 100 |
| Mean temperature in polymer phase (°C.) | 65 | 65 |

The pre-polymerization catalyst was prepared in the same manner as described in Example 1 except that the solid catalyst component (2) was used. The value in the table was shown by converting to the solid catalyst component (2).

| Catalyst component | |
| --- | --- |
| The pre-polymerization catalyst [calculated by conversion to the solid catalyst component (2)] | 1.4 g/hr. |
| Diethylaluminum chloride | 8.0 g/hr. |
| Triethylaluminum | 0.62 g/hr. |
| Methyl methacrylate | 1.3 g/hr. |

The polymerization results are shown in Table 1 and FIG. 5, and the properties of the polymer thus obtained are shown in Table 2.

During the polymerization reaction, there was no specific problem as to the reactor A, but in the reactor B, closing of the exit of the reactor and the line of 1 inch occurred four times when the polymer particles were taken out with a nozzle of 1 inch. Besides, after treating in a 200 liter agitating vessel, the polymer particles were hardly removed, contrary to Example 6, and a large amount of polymer particles remained in the reactor. When the reactors were checked, there was no problem as to the reactor A like in Example 6, but in the reactor B, tacky polymer (about 5 kg) was adhered at the position corresponding to the lower region of the concentrated phase of the polymer. Besides, at the position corresponding to the diluted phase of the polymer, tacky polymer was adhered in a lamellar state. The polymer had significantly inferior impact strength at a low temperature as compared to the product in Example 6.

TABLE 1

| Ex. No. | Mean particle size (μm) | σg | [η]p (dl/g) | [η]T (dl/g) | Ethylene content (wt. %) | Ratio of polymerization amount in second step (wt. %) | Adhesion force of polymer particles (g/cm$^2$) |
| --- | --- | --- | --- | --- | --- | --- | --- |
| Ex. 1 | 640 | 1.3 | 1.71 | 2.06 | 14.8 | 36 | 2.5 |
| Ex. 6 | 620 | 1.3 | 1.53 | 2.26 | 13.9 | 41 | 2.8 |
| Ref. Ex. 6 | 630 | 1.2 | 2.12 | 2.42 | 8.0 | 20 | 7.2 |

TABLE 2

| Items | Unit | Example 1 | Example 6 | Ref. Ex. 6 |
|---|---|---|---|---|
| Melt index | g/10 min. | 4.0 | 3.4 | 2.3 |
| Flexural rigidity | kg/cm$^2$ | 5,900 | 4,800 | 9,200 |
| Vicat softening point | °C. | 51 | 45 | 77 |
| Izod impact strength 23° C. | kg·cm/cm$^2$ | 70 | 73 | 51 |
| 0° C. | | 79 | — | 9.5 |
| −20° C. | | 19 | 37 | 4.5 |
| −30° C. | | 12 | 13 | 3.5 |
| Tensile test YS | kg/cm$^2$ | 160 | 150 | 250 |
| US | kg/cm$^2$ | 160 | 170 | 340 |
| UE | % | 480 | 570 | 770 |

TABLE 3

| | Catalyst components | | | First step | | Second step | |
|---|---|---|---|---|---|---|---|
| Ex. No. | Solid cat. compt. Kind | Amount (g) | DEAC Amount (g) | H$_2$ (atm) | Propylene (g) | Polymerization time (hr.) | H$_2$ (atm) | Polymerization time (hr.) |
| Ex. 2 | Solid cat. compt. (1) | 0.0869 | 3.0 | 2.8 | 1,200 | 1.0 | 0.79 | 2.5 |
| Ex. 3 | Solid cat. compt. (1) | 0.0877 | 3.0 | 2.8 | 1,200 | 1.0 | 0.79 | 3.1 |
| Ex. 4 | Solid cat. compt. (1) | 0.0956 | 3.0 | 2.8 | 1,200 | 1.0 | 0.79 | 3.4 |
| Ref. Ex. 1 | Solid cat. compt. (2) | 0.0973 | 3.0 | 2.8 | 1,200 | 1.0 | 0.79 | 1.3 |
| Ref. Ex. 2 | Solid cat. compt. (2) | 0.1084 | 3.0 | 2.8 | 1,200 | 1.0 | 0.79 | 1.4 |
| Ref. Ex. 3 | Solid cat. compt. (2) | 0.0932 | 3.0 | 2.8 | 1,200 | 1.0 | 0.79 | 1.7 |
| Ref. Ex. 4 | Solid cat. compt. (3) | 0.1126 | 3.0 | 2.8 | 1,200 | 1.0 | 0.79 | 1.8 |
| Ref. Ex. 5 | Solid cat. compt. (3) | 0.1034 | 3.0 | 2.8 | 1,200 | 1.0 | 0.06 | 1.8 |

TABLE 4

| Ex. No. | Polymerization amount (g) | Mean particle Size (μm) | σg | [η]$_P$ (dl/g) | [η]$_T$ (dl/g) | [η]$_{EP}$ (dl/g) | Ethylene content (wt %) | Ratio of polymerization amount in 2nd step (wt %) | Adhesion force of polymer particles (g/cm$^2$) | CXS in 1st step (wt %) | Melt Index (g/10 min) | State in autoclave |
|---|---|---|---|---|---|---|---|---|---|---|---|---|
| Ex. 2 | 327 | 470 | 1.1 | 1.52 | 2.22 | 3.7 | 16 | 32 | 2.4 | 2.1 | 3.4 | No problem |
| Ex. 3 | 341 | 470 | 1.2 | 1.46 | 2.16 | 3.3 | 16 | 38 | 2.6 | 1.9 | 3.2 | No problem |
| Ex. 4 | 393 | 480 | 1.3 | 1.48 | 2.27 | 3.4 | 18 | 41 | 3.1 | 1.9 | 2.9 | No problem |
| Ref. Ex. 1 | 267 | 490 | 1.2 | 1.51 | 1.89 | 3.6 | 8.3 | 18 | 6.0 | 3.2 | 7.6 | Polymer particles adhered |
| Ref. Ex. 2 | 300 | 490 | 1.3 | 1.46 | 1.90 | 3.8 | 9.1 | 19 | 7.9 | 3.1 | 7.3 | Polymer particles aggregated |
| Ref. Ex. 3 | 275 | 500 | 1.2 | 1.50 | 2.01 | 3.7 | 11 | 23 | 12.0 | 3.2 | 6.6 | Polymer particles aggregated |
| Ref. Ex. 4 | 413 | 530 | 1.9 | 1.49 | 2.29 | 3.9 | 16 | 33 | 6.8 | 3.0 | 3.1 | Polymer particles adhered |
| Ref. Ex. 5 | 382 | 540 | 2.0 | 1.49 | 3.63 | 8.2 | 15 | 32 | 5.1 | 3.2 | 0.2 | Polymer particles adhered |
| Ex. 5 | 340 | 520 | 1.5 | 1.33 | 2.36 | 3.9 | 18 | 40 | 2.1 | 3.6 | 2.7 | No problem |

As shown in the above Examples and Reference Examples, the present invention can produce the desired α-olefin block copolymer having extremely excellent impact resistance at a low temperature and molding and processing characteristics, and also polymer particles having a narrow distribution of particles and a low adhesion force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the production of α-olefin block copolymer particles which comprises the steps of
   (1) homopolymerizing propylene or copolymerizing propylene with a comonomer of ethylene or an α-olefin having 4 to 6 carbon atoms so that the comonomer content of the copolymerization product produced is not more than 6% by mole, said polymerization being carried out utilizing propylene in a liquid or gaseous phase,
   (2) in the presence of the product produced by step (1), homopolymerizing ethylene or copolymerizing ethylene with propylene, with an α-olefin having 4 to 6 carbon atoms or with a mixture thereof so that the ethylene content in the copolymerization product produced is not less than 10% by mole, said copolymerizing being carried out utilizing propylene in a liquid or a gaseous phase when present, the polymerization being carried out in the degree of 10 to 70% by weight based on the total polymerization amount, said polymerizaton in said first and second steps being carried out in the presence of a catalyst system comprising (A) a solid catalyst component containing at least titanium, chlorine and an electron-donating compound and having a pore volume of not less than 0.08 cc/g in the range of a pore radius of 200 to 15,000 Å, a mean particle size of 5 to 100 μm, and a geometric standard deviation (σg) of the particle distribution of not more than 2, and (B) an organic aluminum compound.

2. The process for the production of α-olefin block copolymer particles according to claim 1, wherein the catalyst system is a system that when said propylene is polymerized by use of said liquified propylene in the presence of said catalyst system at 65° C. for 4 hours, polypropylene is produced in an amount of not less than 6,000 g per 1 g of the solid catalyst component, and said polypropylene contains not more than 5% by weight of a component which is soluble in xylene at 20° C.

3. The process for the production of α-olefin block copolymer particles according to claim 1, wherein the catalyst system is a system that when said propylene is polymerized by using said liquefied propylene in the presence of said catalyst system at 65° C. for 4 hours, polypropylene is produced in an amount of not less than 6,000 g per 1 g of the solid catalyst component, and said polypropylene contains not more than 4% by weight of a component which is soluble in xylene at 20° C.

4. The process for the production of α-olefin block copolymer particles according to claim 1, wherein the catalyst system comprises (A) a solid catalyst component consisting essentially of a titanium compound carried on a magnesium compound and 1 to 20% by weight of an electron donating compound selected from ether compounds and ester compounds, which has a pore volume of not less than 0.1 cc/g in the range of a pore radius of 200 to 15,000 Å, a mean particle size of 10 to 75 μm, and a geometric standard deviation (σg) of the particle distribution of not more than 1.8.

(B) an organic aluminum compound of the formula: $R_e AlX_{3-e}$ wherein R is a hydrocarbon group having 1 to 18 carbon atoms, X is a halogen atom, and e is a number in the formula $2.5 \leq e \leq 3$ in an amount of 40 to 1,500 mole per 1 mole of titanium in the solid catalyst component (A), and (C) an electron donor selected from the group consisting of esters, amines, and organic silicon compounds having Si—O—C bond in an amount of not more than 1 mole per 1 mole of the organic aluminum compound (B).

5. The process for the production of α-olefin block copolymer particles according to claim 1, wherein the catalyst system comprises (A) a solid catalyst component comprising a titanium compound of the formula: $Ti(OR^1)_b Cl_{3-b}$ wherein $R^1$ is a hydrocarbon group having 1 to 20 carbon atoms and b is a number in the formula $0.001 < b < 0.15$, and 1 to 15% by weight of an ether compound, which has a pore volume of not less than 0.1 cc/g in the range of a pore radius of 200 to 15,000 Å, a mean particle size of 10 to 75 μm, and a geometric standard deviation (σg) of the particle distribution of not more than 1.8, and (B) an organic aluminum compound of the formula: $R_2 AlX$ wherein R is a hydrocarbon group having 1 to 18 carbon atoms and X is a halogen atom in an amount of 1 to 30 mole per 1 mole of titanium in the solid catalyst component (A).

6. The process for the production of α-olefin block copolymer particles according to claim 1, wherein the catalyst system comprises (A) a solid catalyst component comprising a titanium trichloride having a layer structure and 1 to 15% by weight of an ether compound, which has a pore volume of not less than 0.1 cc/g in the range of a pore radius of 200 to 15,000 Å, a mean particle size of 10 to 75 μm, and a geometric standard deviation (σg) of the particle distribution of not more than 1.8, and (B) an organic aluminum compound of the formula: $R_2 AlX$ wherein R is a hydrocarbon group having 1 to 18 carbon atoms and X is a halogen atom in an amount of 1 to 30 mole per 1 mole of titanium in the solid catalyst component (A).

7. The process for the production of α-olefin block copolymer particles according to claim 2, wherein said polymer produced in the first step contains not more than 15% by weight of a component which is soluble in xylene at 20° C.

8. The process for the production of α-olefin block copolymer particles according to claim 3, wherein said polymer produced in the first step contains not more than 5% by weight of a component which is soluble in xylene at 20° C.

* * * * *